United States Patent [19]

Sands

[11] Patent Number: 4,953,588
[45] Date of Patent: Sep. 4, 1990

[54] DUAL CHECK VALVE
[75] Inventor: Robert E. Sands, Shelbyville, Ill.
[73] Assignee: Mueller Co., Decatur, Ill.
[21] Appl. No.: 394,647
[22] Filed: Aug. 16, 1989
[51] Int. Cl.$^5$ ............................................. F16K 15/06
[52] U.S. Cl. ................................................. 137/512.3
[58] Field of Search ............................. 137/512, 512.3
[56] References Cited
U.S. PATENT DOCUMENTS

| | | | |
|---|---|---|---|
| 1,960,963 | 5/1934 | Wheeler | 137/512.3 X |
| 2,500,156 | 3/1950 | Dechant | 137/512.3 |
| 4,172,469 | 10/1979 | Boehringer | 137/512.3 |
| 4,185,656 | 1/1980 | Braukmann | 137/512.3 |

Primary Examiner—Robert G. Nilson
Attorney, Agent, or Firm—Cushman, Darby & Cushman

[57] ABSTRACT

A valve housing is provided with an interior passage therethrough with the passage having two spaced apart valve seats; a first check valve member for engaging the first valve seat has a valve stem movably carried in a hollow shaft; the second valve member is itself provided with a tubular stem having an open end and which is slidably fitted on the exterior of the hollow shaft; separate coil springs are provided for urging each valve member toward a closed position on the respective valve seat whereby the each valve member is operable independently of the other valve member.

13 Claims, 2 Drawing Sheets

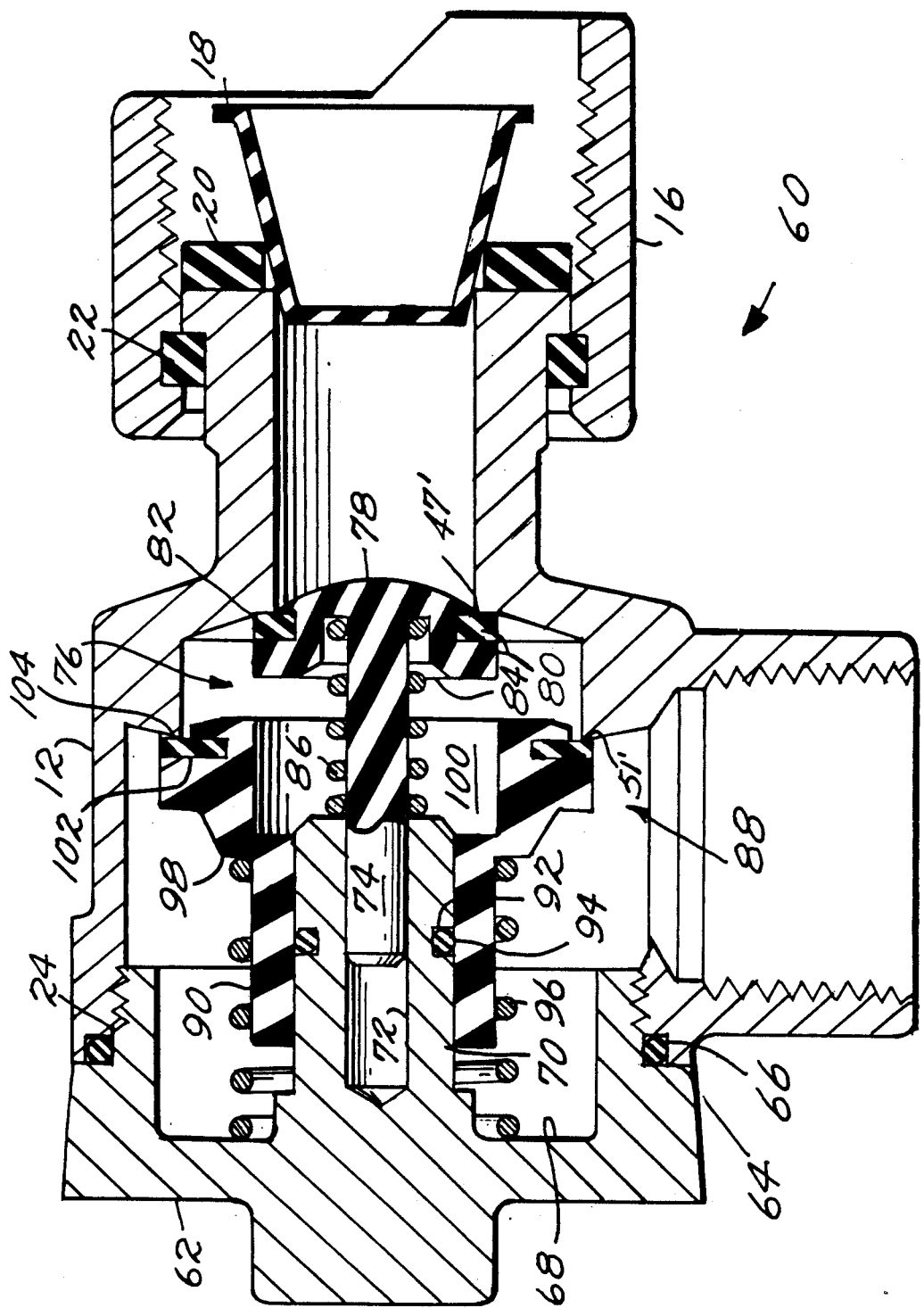

DUAL CHECK VALVE

BACKGROUND AND SUMMARY OF THE INVENTION

The present invention relates to dual check valves of the type where each check valve is located in a single fluid passage and where each valve member is spring biased to a closed position whereby opening of the valves will occur in response to a predetermined increase in fluid pressure at the inlet to the valve housing.

In a number of fluid handling systems, dual type check valves have frequently been used chiefly as safety devices to guard against back-flow in the fluid systems. Further, in the past, dual check valves have been configured so that the resilient force urging the downstream valve towards its closed position would be utilized to assist in maintaining the upstream located valve member in its closed position. Further, fluid pressure acting on the upstream valve member would, in many structures, be transmitted through the upstream valve member to the downstream valve member thus often negating the benefit of having dual check valves in the fluid passage.

Recognizing these disadvantages, a new ASSE standard now requires that each of the check valves in a dual system have no common parts except for the body housing and that there be no contact between any moving parts of either of the check valves in the course of their operation. Thus, the failure of either one of the check valves will have no effect on the operation of the other check valve.

As a consequence of this standard change, it has been necessary to reequip a number of dual check valve assemblies in order to assure compliance with the standard particularly where certification of the fluid handling system is required such as by a government agency.

One of the principle difficulties confronting valve designers in these circumstances is the provision of a dual check valve assembly with independently operating check valves that can be installed within the design constraints of an already existing fluid handling system to avoid the expense of realigning high pressure conduits to accommodate new valve housings of different or increased dimensions.

SUMMARY OF THE INVENTION

The present invention provides an improved dual check valve where the check valves operate independently of one another and yet provide backup for one another without requiring a completely redesigned valve housing having greater external dimensions than a previously employed dual check valve device.

In the preferred embodiment, the present invention provides, in a valve housing, a first upstream valve seat of a selected diameter and a second downstream valve seat of greater diameter than the selected diameter of the first valve seat. A cap member is provided which closes one end of the valve housing adjacent the outlet thereof and includes a hollow tubular shaft extending for the inside face thereof. A first valve member is provided on its downstream face with a stem which is slidably received in the hollow shaft of the cap. The second valve member is provided with a cylindrical stem which is carried on the exterior of the tubular shaft. Separate coil springs are employed to urge each of the respective valve elements against their respective seats. The head of the second valve element is provided with a cavity or recess for receiving without obstruction the head of the first valve element when that valve element is moved towards an open position under the action of fluid pressure at the inlet to the valve housing.

With the foregoing arrangement, as described in detail hereinafter, a dual check valve assembly is provided wherein each of the check valves will be operated completely independently of each other thus providing a greater margin of safety in controlling fluid flow.

The foregoing and other advantages will become apparent as consideration is given to the following detailed description taken in conjunction with the accompanying drawings, in which:

BRIEF DESCRIPTION OF THE DRAWINGS

FIG. 2 is a view similar to FIG. 1 showing the improved dual check valve of the present invention.

DETAILED DESCRIPTION OF THE INVENTION

Figure 1:
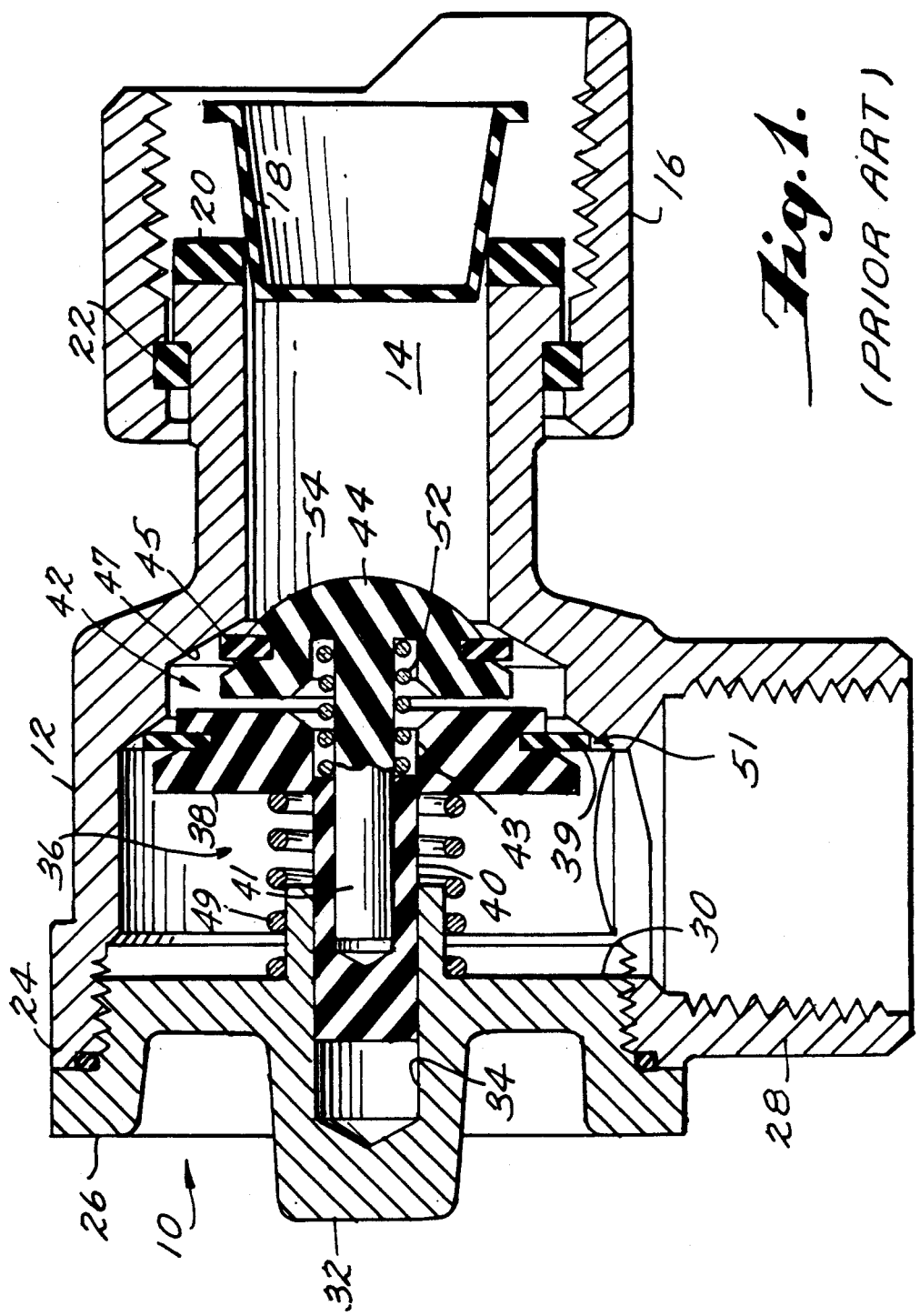
FIG. 1 is a sectional view in side elevation of a prior art dual check valve.

Referring now to the drawings, where like numerals designate corresponding parts throughout the views, there is shown in FIG. 1 a prior art dual check valve assembly 10 which includes a housing 12 having an interior passage extending from the inlet 44 to an outlet 28. The inlet 14 is provided with a coupling nut 16 which may include a wire retainer 22, a flexible washer 20 and a cap 18 which is provided to retain the gasket 20 in the assembly as well as to prevent ingress of debris or dirt during storage of the valve 10. Opposite the inlet 14 the valve housing 12 is provided with a threaded opening 24 which is closed by a threaded cap 26.

The cap 26 is formed with a shaft 34 which is open on the interior side 30 of the cap 26 but which extends through the side 30 and terminates in a closed end defined by a projection 32. A first valve element 36 is provided on the interior passage of the housing 12 and which includes a head member 38 from one side of which extends a hollow stem 40 which is slidably received within the shaft 34.

A second valve element 42 is also provided with a head 44 and a stem 46 which is slidably received in a recess 43 and a hollow bore 41 formed in the stem 40 of the first valve element 36. Both valve elements 36 and 42 may be made of high molecular weight polyethelene or a formulation sold under the trademark "Celcon".

The head 38 of valve element 36 is provided with an annular groove in which is disposed relatively stiff annular rubber facing 39. Similarly, the head 44 of valve element 42 is provided with an annular groove in which is located and carried a facing ring 45 of similar material. The interior passage of the housing 12 is provided with two valve seating surfaces in the form of smooth and preferably machined conical surfaces 47 for valve element 42 and 51 for valve element 36.

A first coil spring 49 surrounds the exterior of the shaft 34 and engages the underside of the head 38 of the valve element 36. Another coil spring 52 surrounds the stem 41 of the valve element 42 and has one end resting on the face of the recess 43 and its opposite end engaging the base of a recess 54 formed in the underside of the head 44 of the second valve element 42. The relative strengths of the springs 49 and 52 will be selected in consideration of the operational characteristics of the fluid handling system in which the valve 10 is installed. Normally, the strengths of the springs 49 and 52 are selected so that the valve element 42 will seal in the opening direction at least at 1 psi applied in the opening direction. In any event, it is clear that in the prior art configuration of FIG. 1, the extent to which valve element 42 is capable of opening will be limited directly by the extent to which valve element 36 can be moved. In this prior art configuration, the valve element 42 can move to force valve element 36 to open because of the small clearances and restrictive dimensions required for these compact devices.

Turning now to FIG. 2, there is illustrated the dual check valve 60 of the present invention. The valve 60 incorporates a number of elements identical to that of the FIG. 1 embodiment of the prior art and these elements bear the same reference numerals described above in conjunction with FIG. 1. The dimensions of the valve housing 12 may, if desired, be identical to that of the FIG. 1 embodiment. Modified elements are assigned new numerals and are described below.

Specifically, each of the valve seats 47' and 51' in the valve 60 are in the form of annular rings as distinct from the conical surfaces of the FIG. 1 embodiment configuration.

In the improved valve assembly of the FIG. 2 embodiment, a cap 62 is threadedly received in the opening 24 and includes an annular surface 64 for compressing the O-ring 66. From the inner surface 68 of the cap 62 centrally located shaft 70 extends a predetermined distance into the interior passage of the housing 12. The shaft 70 is formed with a bore 72 for slidably receiving the stem 74 of the smaller valve element 76. Valve element 76 includes a rounded head portion 78 to facilitate seating and has about its periphery an annular groove 80 for receiving a rubber washer 82 which is so positioned as to sealingly engage the seat ring 47'. On its underside, the head 78 includes an annular recess 84 which has a flared opening to facilitate reception of one end of the coil spring 86 which is carried on stem 74. The opposite end of the coil spring 86 rests on the innermost end of the shaft 70.

The larger valve element 88 includes a tubular stem 90 which has an interior diameter such that the stem 90 can readily slide on the exterior surface of the shaft 70. To prevent leakage between the shaft 90 and shaft 70, the shaft 70 is provided approximately intermediate its ends with a groove 92 which carries an O-ring 94. A coil spring 96 has one end seated on the surface 68 of the cap 62 and its other end engaging the underside 98 of the large valve element 88.

The large valve element 88 is provided in its head with a cavity or recess 100 of a size to fully receive and accommodate the head 78 of the small valve element 76 when the valve element 76 moves to a fully open position. About its external periphery, the valve element 88 is provided with a groove 102 in which is carried an annular rubber washer 104 which will sealingly engage the valve seat 51' when the valve 88 is in its closed position as illustrated in FIG. 2. In this position, the free end of shaft 70 will protrude a small amount into the recess 100 to maintain a separation between the head 78 of valve element 76 so that there will be no contact or interengagement between the valve elements 76 and 88 for any relative positions of operation of these two valve elements as well as their respective coil springs 86 and 96.

From the foregoing, it will be apparent that failure of either valve element will not interfere with continued effective operation of the other valve element while retaining the advantage of providing a dual check valve structure that can be readily substituted in installations previously using the structure of FIG. 1. In addition, the small valve head 78 is permitted to move past the sealing surface 51' of the large valve element 88 without interfering with the operation of the large valve element 88 in spite of the limited space available to accommodate movement of both valve elements.

Having described the invention, it will be apparent to those skilled in the art that various modifications may be made thereto without departing from the spirit and scope of this invention as defined in the appended claims.

What is claimed is:

1. A valve device comprising a housing having an inlet, an outlet and an interior passage connecting said inlet and outlet, said interior passage having first and second spaced apart valve seats each surrounding a common axis of said interior passage, a first valve means, means for mounting said first valve means for movement in said housing toward and away from said first valve seat and second valve means, said means for mounting including support means for said second valve means with said support means permitting movement of said second valve means toward and away from said second valve seat independently of said first valve means, first spring means urging said first valve means toward said first valve seat and having one end engaging a portion of said housing, second spring means urging said second valve means toward said second valve seat and having one end engaging said support means and an opposite end engaging said second valve means with said said second spring means being out of contact with said first valve means for all positions of said second valve means.

2. The invention as claimed in claim 1 wherein each said valve means includes a valve head and a stem connected to said respective head on one side thereof.

3. The invention as claimed in claim 2 wherein said head of said second valve means has a smoothly curved surface.

4. The invention as claimed in claim 2 wherein each said valve head includes a peripheral groove and a flexible seal means is carried in each said groove.

5. The invention as claimed in claim 1 wherein said housing includes another opening and the device includes a closure member for said another opening with said means for mounting carried on said closure member.

6. A valve device comprising a housing having an inlet, an outlet and an interior passage connecting said inlet and outlet, said interior passage having first and second spaced apart valve seats each surrounding a common axis of said interior passage, first valve means movably mounted in said housing for engaging said first valve seat and second valve means mounted in said housing and movable independently of said first valve means to engage said second valve seat, each said valve means including resilient means for constantly urging said respective valve means toward a closed position wherein said respective valve means engages said respective valve seat, each said valve means including a valve head and a stem connected to said respective head on one side thereof, said interior passage including valve support means having an exterior surface and a bore having an opening at one end thereof, the said stem of said first valve means comprising a hollow sleeve having an open end whereby said stem of said first valve means is slidingly carried on the exterior surface of said valve support means and at least a portion of said stem of said second valve means extends through said opening of said bore and is slidingly supported in said bore.

7. The invention as claimed in claim 6 wherein said resilient means of each of said valve means is a coil spring with the coil spring of said first valve means having one end engaging a portion of said interior passage surrounding said valve support means and an opposite end engaging said valve head of said first valve means and the coil spring of said second valve means having one end engaging said one end of said valve support means and the opposite end thereof engaging said head of said second valve means.

8. The invention as claimed in claim 6 wherein said head of said first valve means includes a cavity through which said stem of said second valve means extends, said cavity having a volume sufficient to allow at least a portion of said head of said second valve means to be received therein when said second valve means is moved from said closed position to an open position.

9. The invention as claimed in claim 8 wherein said valve support means comprises a shaft including said bore and an end portion, said shaft extending into said interior passage of said housing to a distance such that, when said first valve means is in said closed position, said end portion of said shaft protrudes into said cavity of said head of said first valve means.

10. The invention as claimed in claim 9 where said exterior surface of said shaft includes an annular groove with seal means carried in said groove.

11. The invention as claimed in claim 9 wherein a portion of said interior passage has a longitudinal axis and said shaft, said bore in said shaft, both said stems of said respective valve means extend parallel to said longitudinal axis.

12. The invention as claimed in claim 11 wherein said shaft, said bore in said shaft and both said stems of said respective valve means extend co-axially with respect to said longitudinal axis.

13. The invention as claimed in claim 6 wherein said housing includes another opening and the device includes a closure member for said another opening with said means for mounting carried on said closure member.

* * * * *